United States Patent
Zhai et al.

(10) Patent No.: US 12,332,769 B2
(45) Date of Patent: Jun. 17, 2025

(54) RECORDING TEST USAGE OF A GRAPHICAL USER INTERFACE WITH BLOCKED INPUTS

(71) Applicants: Hua-Ming Zhai, Shanghai (CN); Er-Xin Shang, Shanghai (CN); Peng-Ji Yin, Shanghai (CN); ENTIT SOFTWARE LLC, Sanford, NC (US)

(72) Inventors: Hua-Ming Zhai, Shanghai (CN); Er-Xin Shang, Shanghai (CN); Peng-Ji Yin, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/608,938

(22) PCT Filed: Jun. 6, 2019

(86) PCT No.: PCT/CN2019/090287
§ 371 (c)(1),
(2) Date: Nov. 4, 2021

(87) PCT Pub. No.: WO2020/243942
PCT Pub. Date: Dec. 10, 2020

(65) Prior Publication Data
US 2022/0300396 A1    Sep. 22, 2022

(51) Int. Cl.
*G06F 11/36* (2006.01)
*G06F 11/3668* (2025.01)

(52) U.S. Cl.
CPC ...... *G06F 11/3684* (2013.01); *G06F 11/3688* (2013.01); *G06F 11/3696* (2013.01)

(58) Field of Classification Search
CPC ........... G06F 11/36–3696; G06F 9/451; G06F 11/3698
See application file for complete search history.

(56) References Cited

U.S. PATENT DOCUMENTS 6,542,165 B1 * 4/2003 Ohkado ................ G06F 3/0481
    715/781
8,261,238 B2 * 9/2012 Van Gogh ............... G06F 21/84
    717/124
(Continued)

FOREIGN PATENT DOCUMENTS

CN    105718353 B    1/2019
JP    2014044615 B2   3/2014

OTHER PUBLICATIONS

Author Unknown: UFT Panes: An Overview; ITE Learn; 2009-2016; 10 Pages.
(Continued)

*Primary Examiner* — Todd Aguilera
(74) *Attorney, Agent, or Firm* — Sheridan Ross P.C.

(57) ABSTRACT

An apparatus may include a processor (102) that may generate automated test scripts to test graphical user interface (GUI) functions of an application under test (AUT) (235). The apparatus may generate a screen element (220) that is overlaid onto at least one or all of the GUIs (210). The screen element (220) may therefore receive user inputs directed at the GUI (210), but block such inputs from being provided to the GUI (210). The user inputs received at the screen element (220) may be recorded in an automated test script for later replay. Blocking the user input may prevent a change in appearance of a GUI element (212) that would otherwise result from the user input, facilitating automated location of the GUI element (212) during replay of the automated test script.

20 Claims, 6 Drawing Sheets

(56) References Cited

U.S. PATENT DOCUMENTS

| | | | |
|---|---|---|---|
| 8,392,886 B2* | 3/2013 | Sweis | G06F 8/74 |
| | | | 717/124 |
| 8,429,612 B2* | 4/2013 | Milov | G06F 11/3692 |
| | | | 717/124 |
| 9,063,766 B2 | 6/2015 | Chow | |
| 9,129,058 B2 | 9/2015 | Cui | |
| 9,348,727 B1 | 5/2016 | Cai | |
| 9,395,943 B2* | 7/2016 | Haas | G06F 3/1285 |
| 9,519,570 B2 | 12/2016 | Srinivasan | |
| 9,588,879 B2 | 3/2017 | Horovitz | |
| 9,734,042 B1 | 8/2017 | Elgarat | |
| 10,181,029 B1 | 1/2019 | Ismael | |
| 2008/0294985 A1* | 11/2008 | Milov | G06F 11/3692 |
| | | | 714/E11.207 |
| 2009/0133000 A1* | 5/2009 | Sweis | G06F 11/3688 |
| | | | 717/124 |
| 2009/0228987 A1* | 9/2009 | Van Gogh | G06F 21/84 |
| | | | 726/27 |
| 2011/0173551 A1 | 7/2011 | Ikegami | |
| 2011/0191676 A1* | 8/2011 | Guttman | G06F 11/3414 |
| | | | 715/768 |
| 2014/0101640 A1 | 4/2014 | Romdhane | |
| 2016/0103643 A1* | 4/2016 | Haas | G06F 3/1246 |
| | | | 347/5 |
| 2020/0153711 A1* | 5/2020 | Chauhan | H04L 41/5096 |
| 2021/0026508 A1* | 1/2021 | Jacobs | G06T 1/20 |

OTHER PUBLICATIONS

Khushboo Kaur; Testing with Ranorex—A Mobile Testing Automation Tool; 3Pillar Global; https://www.3pillarglobal.com/insights/testing-with-ranorex-a-mobile-testing-automation-tool; Sep. 4 2013, 12 pages.

International Search Report & Written Opinion; PCT/CN2019/090287; Mailed Mar. 6, 2020; 16 pages.

* cited by examiner

500

---

INITIATE A RECORDING OF TEST USAGE WITH A GRAPHICAL USER INTERFACE (GUI), THE GUI OCCUPYING SOME OR ALL OF A DISPLAY SPACE OF A DISPLAY AND INCLUDING A GUI ELEMENT
502

↓

RESPONSIVE TO INITIATION OF THE RECORDING, GENERATE A SCREEN ELEMENT THAT IS OVERLAID ONTO THE GUI AND BLOCKS USER INPUTS FROM BEING PROVIDED TO THE GUI TO PREVENT A CHANGE OF STATE OF THE GUI
504

↓

RECEIVE A USER INPUT AT A LOCATION OF THE DISPLAY SPACE CORRESPONDING TO THE GUI ELEMENT, WHEREIN THE USER INPUT IS BLOCKED FROM BEING PROVIDED TO THE GUI BY THE SCREEN ELEMENT
506

↓

GENERATE AN ENTRY IN AN AUTOMATED TEST SCRIPT BASED ON THE USER INPUT
508

*FIG. 5*

MEMORY
600

INITIATE A RECORDING OF TEST USAGE WITH A GRAPHICAL USER INTERFACE (GUI), THE GUI OCCUPYING SOME OR ALL OF A DISPLAY SPACE OF A DISPLAY AND INCLUDING A GUI ELEMENT
602

GENERATE A PARTIALLY OR FULLY TRANSPARENT WINDOW THAT IS OVERLAID ONTO THE GUI AND BLOCKS USER INPUTS FROM BEING PROVIDED TO THE GUI TO PREVENT A CHANGE OF STATE OF THE GUI
604

RECEIVE A USER INPUT, WHEREIN THE USER INPUT IS BLOCKED, BY THE PARTIALLY OR FULLY TRANSPARENT WINDOW, FROM BEING PROVIDED TO THE GUI
606

GENERATE AN ENTRY IN AN AUTOMATED TEST SCRIPT BASED ON THE USER INPUT
608

*FIG. 6*

RECORDING TEST USAGE OF A GRAPHICAL USER INTERFACE WITH BLOCKED INPUTS

BACKGROUND

An application testing system may include a recorder that may record test usage of a graphical user interface (GUI) generated by an application under test (AUT). For example, the recorder may store an indication of a user input at the GUI in an automated test script. Responsive to the user input, the recorder may further store snapshots of the GUI before, during, and after the user input occurred. The application testing system may include a replay component that replays the automated test script to recreate the recorded test usage.

For example, the replay component may determine the location of the user input on the GUI based on the automated test script. The replay component may use computer vision techniques on some or all of the snapshots corresponding to the user input to identify a GUI element (such as a button) at which the user input occurred. The replay component may then replay the automated test script to recreate the user input at the identified GUI element. In this manner, a user may record test usage of a GUI so that the test usage may be automatically recreated in future tests.

BRIEF DESCRIPTION OF THE DRAWINGS

Features of the present disclosure may be illustrated by way of example and not limited in the following figure(s), in which like numerals indicate like elements, in which:

FIG. 5 depicts a flow diagram of an example method for preventing a change of state of the GUI while recording test usage of an AUT; and FIG. 6 depicts a block diagram of an example non-transitory machine-readable storage medium for preventing a change of state of the GUI while recording test usage of the AUT.

DETAILED DESCRIPTION

Figure 1:
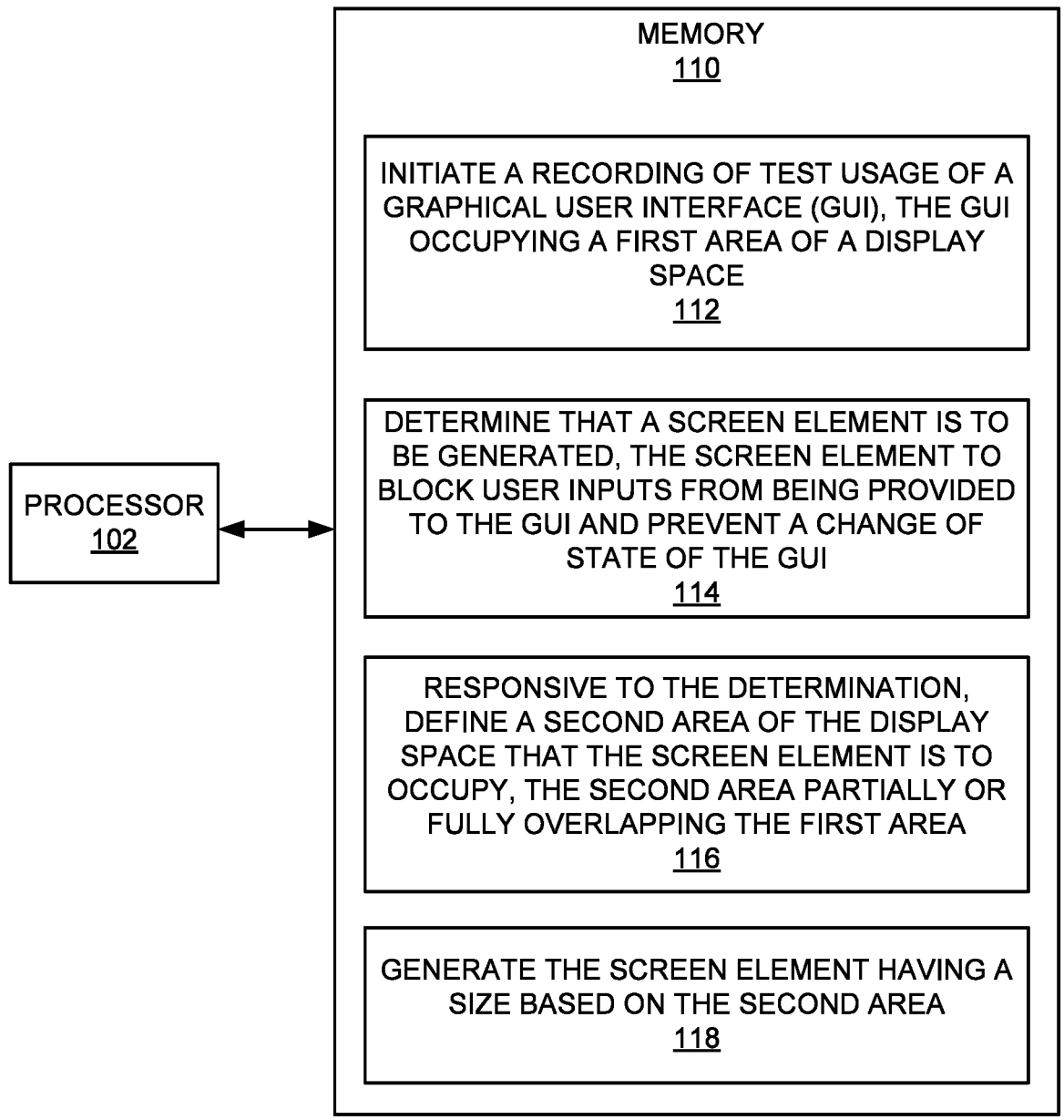
FIG. 1 shows a block diagram of an example apparatus that may prevent a change of state of a graphical user interface (GUI) while recording test usage of an application under test (AUT)

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Automated testing may determine whether changes to an application under test (AUT) and/or GUI have affected GUI functionality. Automated test scripts—together with computer vision techniques to identify GUI elements during replay—may facilitate efficient testing of AUTs without having to have knowledge of the underlying GUI or AUT code. However, in many instances, a user input may alter the state of the GUI such as by changing an appearance of a GUI element at which the user input occurred. For example, a button press may change the size, color, text, or other appearance of the button or otherwise change the state of the GUI. Thus, some or all of the snapshots of the GUI corresponding to the user input may include the altered appearance of the button, rather than the original appearance of the button. In this example, the replay component may not be able to recognize the original appearance of the button using computer vision techniques on the snapshots to replay the automated test script. In other words, based on the snapshots, the replay component may expect to find the altered appearance of the button rather than the original appearance of the button. In these instances, the replay component may be unable to locate the button on the GUI during replay because the altered appearance may not be present in the GUI (absent user input).

Disclosed herein are apparatuses and methods for recording automated test scripts to test graphical user interface (GUI) functions of an application under test (AUT). An apparatus may block some or all user inputs from being provided to a GUI for which test usage is being recorded while continuing to record the blocked inputs for an automated test script. As such, an appearance of a GUI element interacted with via the user input may not be altered by the user input.

The apparatus may block a user input by generating a screen element that blocks user inputs from being provided to the GUI. In some examples, the screen element may be overlaid onto (cover) some or all of the GUI. Thus, the screen element, not the GUI, may receive the user input. As such, the user input may be blocked from the GUI. In this manner, any changes to an appearance of a GUI element resulting from the user input is avoided while the user input is recorded for the automated test script.

In some examples, the screen element may include a partially or fully transparent window that is overlaid onto the GUI. The transparent window may permit a user to continue to record user inputs while preventing the user inputs from actually being provided to the GUI. Instead, the transparent window may receive the user inputs to be recorded in an automated test script. The apparatus may determine that the screen element is to be generated based on a user request to create the screen element (giving the user control of whether and when to block inputs), automatically based on a predefined listing of events that trigger generation of the screen element, automatically based on initiation of test usage recording, and/or at other times. It should be noted that "generation" of the screen element and similar terms may refer to placing the screen element in an "on" or "activated" state as described herein.

Figure 2:
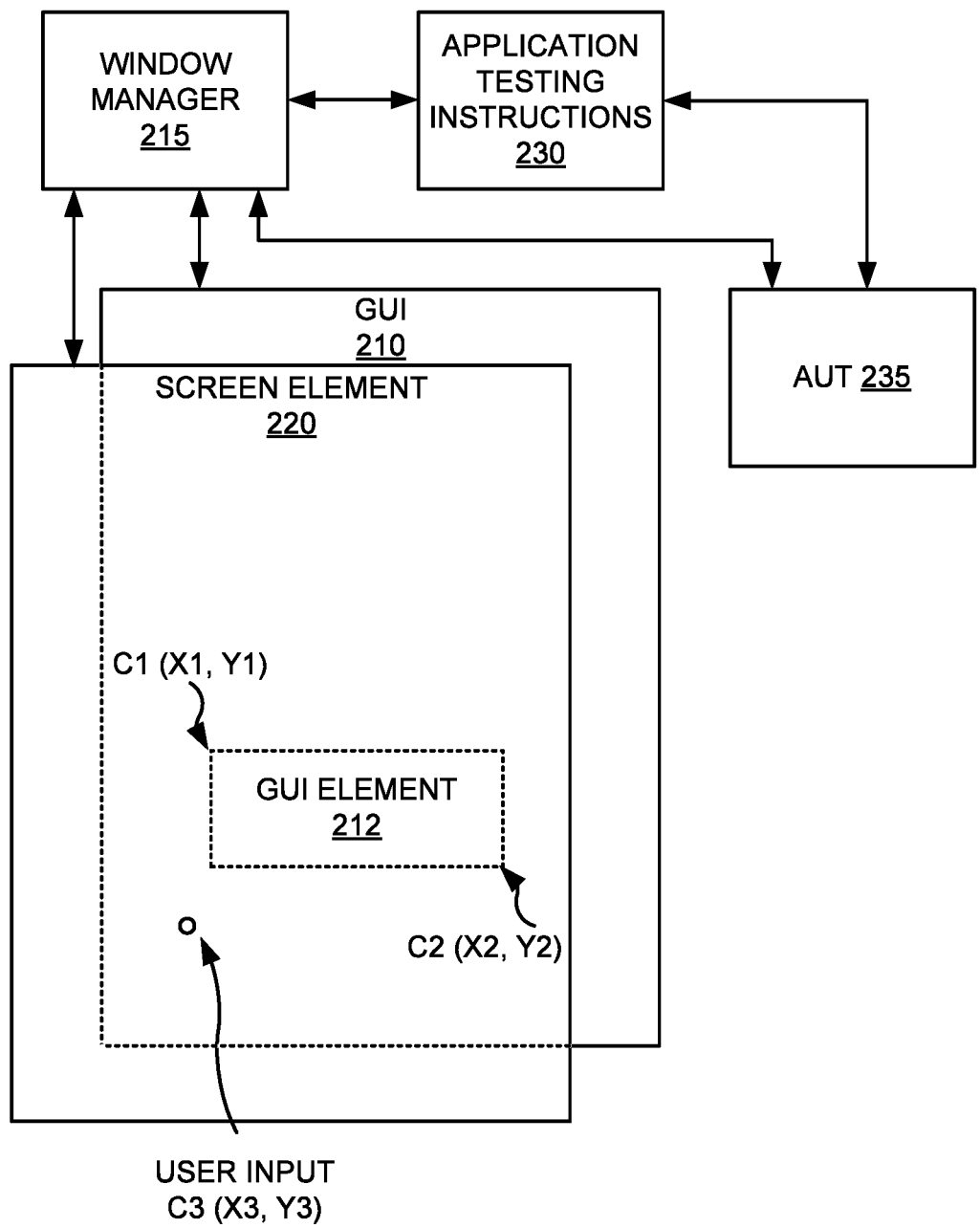
FIG. 2 shows an example of a screen element overlaid onto a GUI while recording test usage of the AUT.

Reference is first made to FIGS. 1 and 2. FIG. 1 shows a block diagram of an example apparatus 100 that may prevent a change of state of a graphical user interface (GUI), such as a GUI 210 illustrated in FIGS. 2, 3A, 3B, and 4, while recording test usage of an application under test (AUT), such as the AUT 235 illustrated in FIGS. 2 and 4.

Figure 3B:
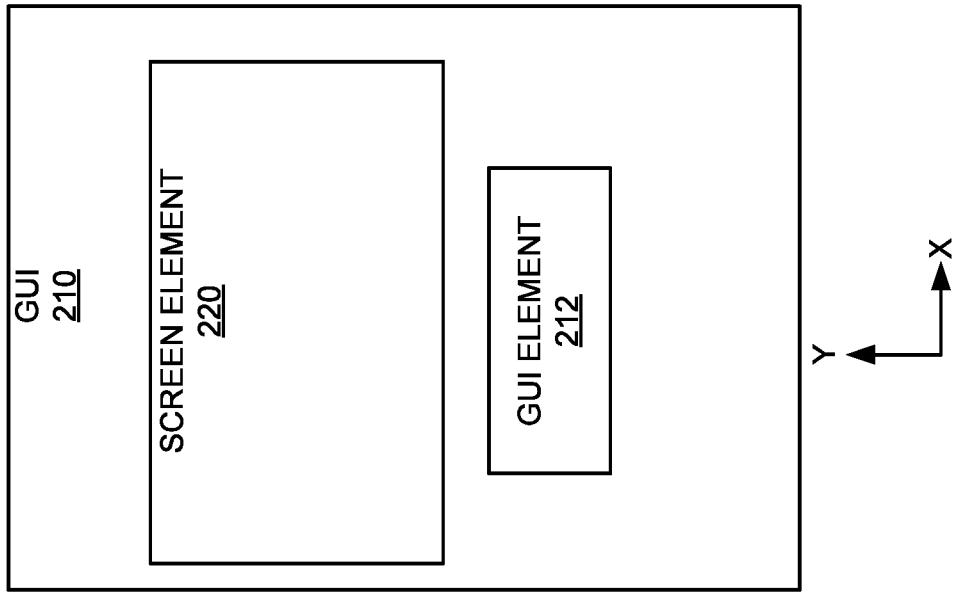
FIGS. 3A and 3B, respectively, show examples of moving a screen element overlaid onto a GUI while recording test usage of the AUT
Figure 3A:
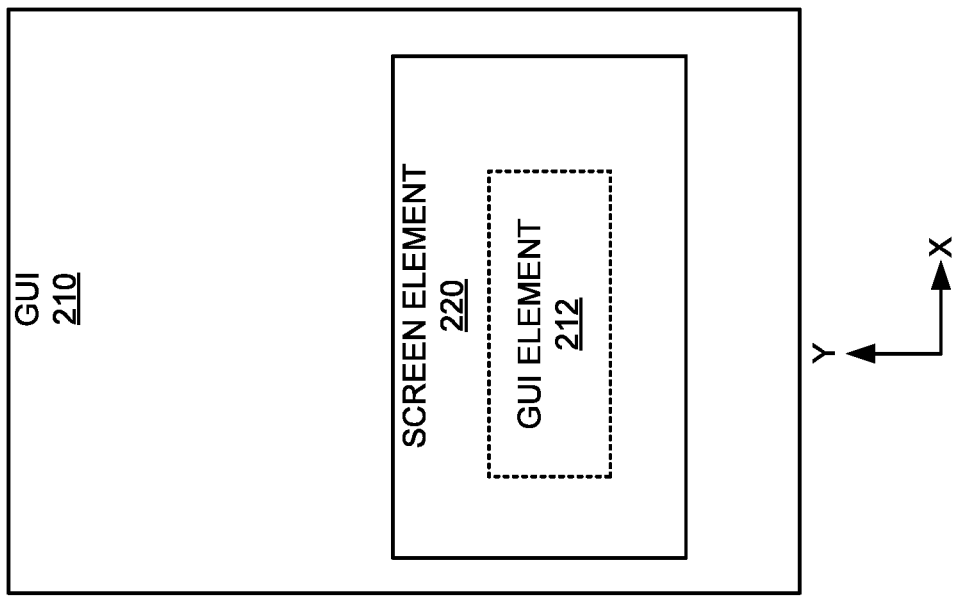
Figure 4:
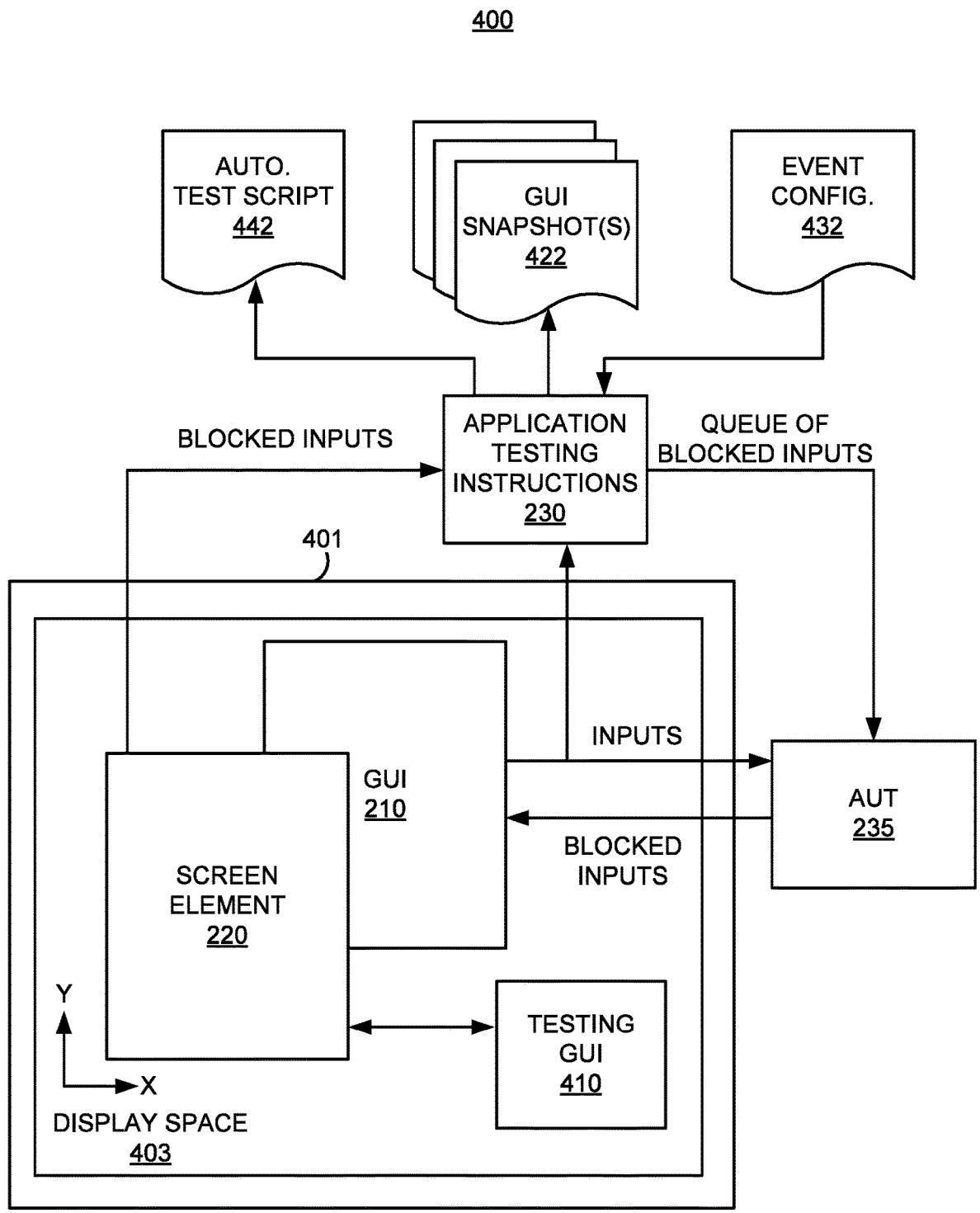
FIG. 4 shows a data flow diagram of an example system of preventing a change of state of the GUI while recording test usage of the AUT.

FIG. 2 shows an example of a screen element 220 overlaid onto a GUI 210 while recording test usage of the AUT 235 (which may generate the GUI 210). An X/Y axis legend is shown in FIG. 2 for orientation purposes. The X/Y legend in the same orientation is also illustrated in FIGS. 3A, 3B, and 4. As used herein, the term "overlaid" and similar terms such as "overlay" and "overlaying" may refer to being layered on top of. In a window display environment, for example, a window manager 215 (which may be provided by an operating system) may overlay the screen element 220 on top of the GUI 210 by layering a window corresponding to the screen element 220 on top of a window corresponding to the GUI 210. Such layering may cause the overlaid window (such as a window corresponding to the screen element 220) to be block user inputs to a lower window (such as the GUI 210).

It should be understood that the example apparatus 100 depicted in FIG. 1 and the screen element 220 depicted in FIG. 2 may include additional features and that some of the features described herein may be removed and/or modified without departing from any of the scopes of the example apparatus 100 or the screen element 220.

The apparatus 100 shown in FIG. 1 may be a computing device, a server, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scopes of the apparatus 100 disclosed herein.

The apparatus 100 may include a memory 110 that may have stored thereon machine-readable instructions (which may also be termed computer readable instructions) 112-118 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. Attention will now turn to operations at processor 102 to prevent a change of state of a GUI (such as a GUI 210 illustrated in FIGS. 2, 3A, 3B, and 4) while recording an AUT (such as AUT 235 illustrated in FIGS. 2 and 4).

Referring to FIG. 1, the processor 102 may fetch, decode, and execute the instructions 112 to initiate a recording of test usage of a graphical user interface (GUI) 210, the GUI 210 occupying a first area of a display space. The processor 102 may fetch, decode, and execute the instructions 114 to determine that a screen element (such as a screen element 220) is to be generated. Examples of the screen element 220 are illustrated in FIGS. 2, 3A, 3B, and 4. The screen element 220 may block user inputs from being provided to the GUI 210 and prevent a change of state of the GUI 210 such as by preventing a change of appearance of a GUI element 212.

In some examples, the processor 102 may determine that the screen element 220 is to be generated based on a user request to generate the screen element 220. For example, the processor 102 may receive, from a testing GUI (such as testing GUI 410 illustrated in FIG. 4) separate from the GUI 210, a request to block the user inputs from being provided to the GUI 210. The testing GUI 410 may include a first testing GUI element (not shown) that when actuated may request the screen element 220. The processor 102 may receive the request to block the user inputs form the testing GUI 410 based on actuation of the first testing GUI element.

In some examples, the testing GUI 410 may include a second testing GUI element that when actuated removes the screen element 220. The processor 102 may receive an indication that the second testing GUI element was actuated and may remove the screen element 220 based on the indication that the second testing GUI element was actuated. The screen element 220 may be removed by being placed in the off state or by being placed in a de-activation state as described herein. Upon removal of the screen element 220, the processor 102 may receive a second input at a second GUI element. Thus, another user input at the second GUI element may not be blocked by the screen element 220. The processor 102 may generate an entry in the automated test script based on the second input, and the second input may be provided to the GUI 210. It should be noted that the first testing GUI element and/or the second testing GUI element may be replaced or otherwise initiated via keyboard shortcuts or other input from the user to request that the screen element be generated or removed.

In some examples, the processor 102 may determine that the screen element 220 is to be generated based on an event configuration that specifies a plurality of events that each triggers generation of the screen element 220. For example, the processor 102 may access the event configuration and determine that an event of the plurality of events has occurred. Such events may include a listing of user inputs or other actions that may occur during a recording of test usage of the AUT 235. In particular, the event configuration may specify that certain user inputs are to be blocked, such as user inputs that may cause a change in appearance to a GUI element 212. In this manner, events for which user inputs are to be blocked may be predefined so that they do not interfere with test usage recording and may not require manual activation of the screen element during such test usage recording.

In some examples, the processor 102 may determine that the screen element is to be generated upon initiation of test usage recording. For example, the processor 102 may determine that the recording was initiated and generate the screen element upon initiation of the recording.

Responsive to a determination that the screen element 220 is to be generated (whether based on a user request or automatically), the processor 102 may fetch, decode, and execute the instructions 116 to define a second area of the display space that the screen element 220 is to occupy, the second area partially or fully overlapping the first area.

In some examples, to define the second area, the processor 102 may set the second area to be substantially equal to the first area. In some of these examples, the processor 102 may determine a location of the GUI 210 in a display space at which the GUI 210 is displayed and set the second area based on the location of the GUI 210. For example, the processor 102 may set the second area to be co-located and layered on top of the GUI 210.

In some examples, to define the second area, the processor 102 may identify a GUI element area of the display space occupied by a particular GUI element 212 to be blocked. For example, the processor 102 may identify an area of the display space occupied by the GUI element and set the second area to include the area of the display space occupied by the GUI element 212.

The processor 102 may fetch, decode, and execute the instructions 118 to generate the screen element 220 having a size based on the second area. The screen element 220 may include a partially or fully transparent window. The processor 102 may overlay the partially or fully transparent window on the GUI to block the user inputs in the second area from being provided to the GUI. For example, the application testing instructions 230 may instruct the window manager 215 to generate a partially or fully transparent window to serve as the screen element 220. In this manner, the GUI 210 may continue to be visible even though the screen element 220 is overlaid onto the GUI 210. Any portion of the screen element 220 that overlays the GUI 210 may block user inputs at the portion of the GUI 210 that is covered by the screen element 220.

As such, a user input to the GUI element 212 may be received at the screen element 220 because the screen element 220 is overlaid onto the GUI 210 in the region of the GUI element 212. The GUI element 212 may include a button, a link (such as a hyperlink), a text input area, and/or other element of a GUI that may receive a user input. The GUI element 212 is illustrated as a box bounded by coordinates C1 (X1, Y1) and C2 (X2, Y2), although other shapes and sizes of inputs may be used. The window manager 215 may receive the user input via the screen element 220 and provide an indication of the input to the application testing instructions 230.

In some examples, the processor 102 may receive a user input in the second area. The user input may be blocked by the screen element from being provided to the GUI. The processor 102 may determine a location of the user input and generate an entry in an automated test script based on the received user input and the determined location. Thus, the processor 102 may store a location of the user input so that the user input may be later replayed using the automated test script.

In some examples, the screen element 220 may be the same size as the GUI 210. That is, a screen area occupied by the screen element 220 may be the same as a screen area occupied by the GUI 210. In some examples, the screen element 220 may be larger or smaller than the GUI 210. In either of the foregoing examples, the screen element 220 may be moveable with respect to the GUI 210, as shown in FIGS. 3A and 3B. Alternatively, the screen element 220 may be fixed, such as when the screen element 220 is in a fixed position that overlays the GUI 210. In some examples, the screen element 220, when overlaid onto the GUI 210, may block user inputs at overlaid portions from being provided to the GUI 210.

Furthermore, in some examples, a user input at a position in the screen element 220 may have a 1:1 correspondence with a position in the GUI 210. For example, when the screen element 220 and the GUI 210 are the same size and are aligned together on the X and Y axes with respect to one another, then the position of a user input at the screen element 220 may correspond to the same position at the GUI 210. However, when the screen element 220 and the GUI 210 are not the same size and/or are not aligned on the X axis or Y axis, then a position of a user input at the screen element 220 may not correspond to the position on the GUI 210 if relative window positioning in a display area is used. In these examples, the application testing instructions 230 may perform a transformation to arrive at the position on GUI 210 that corresponds to a position of the user input at the screen element 220. For example, if the screen element 220 is offset from the GUI 210 by N pixels on the X axis, the application testing instructions 230 may adjust the X-axis position (X3) of the user input by N pixels.

In some examples, the application testing instructions 230 may receive an indication of the type of user input and location (C3 (X3, Y3)) of the user input from the window manager 215 via input at the screen element 220. Continuing the foregoing example, a user may simulate user inputs provided to the GUI element 212 even though the (partially or fully transparent) screen element 220 may be overlaid onto the GUI element 212 and block such inputs. Thus, the user may provide the user inputs for recording in an automated test script without such user inputs potentially altering an appearance of the GUI element 212.

In some examples, the screen element 220 may be moveable (by a user, for example) with respect to the GUI 210. To illustrate, FIGS. 3A and 3B, respectively, show examples of moving a screen element 220 overlaid onto the GUI 210 while recording test usage of the AUT 235. In the example illustrated at FIG. 3A, the screen element 220 may be overlaid onto the GUI 210 in a manner that the GUI element 212 is covered by the screen element 220. The screen element 220 may block the user inputs to the GUI element 212. On the other hand, in the example illustrated at FIG. 3B, the screen element 220 may be moved away from the GUI element 212 (the screen element 220 may or may not continue to partially or fully overlap the GUI 210). In this example, the screen element 220 may cover the GUI element 212. As such, the screen element 220 may not block inputs at the GUI element 212.

Having described a screen element 220 overlaid onto the GUI 210, an example of recording test usage of the AUT 235 will now be described with reference to FIG. 4. FIG. 4 shows a data flow diagram of an example system 400 of preventing a change of state of the GUI 210 while recording test usage of the AUT 235. The system 400 may include application testing instructions 230. The application testing instructions 230 may cause a processor, such as processor 102 illustrated in FIG. 1, to generate a screen element 220 and record test usage of the AUT 235 via a display 401. For example, the application testing instructions 230 may be stored at the memory 110 and executed by the processor 102, both of which are illustrated in FIG. 1. It should be noted that the application testing instructions 230 may include some or all of the instructions 112-118 illustrated in FIG. 1, instructions that facilitate the operations illustrated in FIGS. 5 and 6, and/or other instructions.

The display 401 may include a display device to provide a display space 403 (which may also be referred to as "screen space"). Such display devices may include liquid crystal display devices or other types of display devices that may provide visual displays. In some examples, as illustrated, the GUI 210, screen element 220, and a testing GUI 410 may be displayed via the display space 403. As such, in these examples, the GUI 210, screen element 220, and testing GUI 410 may each occupy an area of the display space 403. In other examples, the testing GUI 410 may be displayed on a separate display area (not illustrated).

In some examples, the application testing instructions 230 may provide the testing GUI 410 to be displayed in the display space 403. The testing GUI 410 may include testing GUI elements (not illustrated) that cause a change of state of the screen element 220. For example, the screen element 220 may be in one of various states, including an on state, an activated state, a de-activated state, and an off state. The on state may refer to the screen element 220 being created and displayed (whether or not the screen element 220 is displayed partially or fully transparent) in the display space 403. When in the on state, the screen element 220 may be moved about the display space 403. Furthermore, when in the on state, the screen element 220 be either in an activated or de-activated state. In the activated state, the screen element 220 may receive user inputs and block such inputs from a GUI element of the GUI 210 if the screen element 220 is overlaid onto the GUI element. In the de-activated state, the screen element 220 forward any received inputs to the GUI 210. Thus, in a de-activated state, the screen element 220 may be displayed in the display space 403 and receive user inputs, but not block user inputs to the GUI 210 because the screen element may cause such inputs to be forwarded to the GUI 210. The off state may refer to the screen element 220 not being displayed in the display space 403.

The state of the screen element 220 may be controlled in various ways. For example, the state may be manually controlled based on user input via the testing GUI 410, automatically upon test recording initiation, automatically based on events specified in an event configuration (config.) 432, and/or other state controls. The state of the screen element 220 may be stored as a screen element state value that may be updated each time the state of the screen element 220 is changed. In examples of user input control of the state, the testing GUI 410 may include testing GUI elements (not illustrated) that may receive inputs to change the state of the screen element 220. For example, the testing GUI 410 may include a first testing GUI element that when selected causes the screen element 220 to be in the on state. In this example, a user (who is providing user inputs to test the GUI 210 and the AUT 235) may turn on the screen element 220 on-demand. In some of these examples, the first testing GUI element when selected again may cause the screen element 220 to be in the off state. In other examples, the testing GUI 410 may include a second testing GUI element that when selected causes the screen element 220 to be in the off state. In these examples, the first testing GUI element may be an "on" screen element button and the second testing GUI element may be an "off" screen element button. The testing GUI 410 may similarly provide testing GUI elements to set the activated and/or de-activated states of the screen element 220.

In some examples, the state of the screen element 220 may be changed automatically upon recording test usage of the AUT 235. For example, the application testing instructions 230 may automatically set the state to an activated state when the recording of the AUT 235 is initiated. For example, when a user starts the test of the AUT 235 (through, for example, the testing GUI 410), the application testing instructions 230 may activate the screen element 220 and set its size to cover a portion or all of the GUI 210. In some examples, when a recording of the test of the AUT 235 is complete, the application testing instructions 230 may turn off the screen element 220.

In some examples, the state of the screen element 220 may be changed automatically based on an event config. 432. The event config. 432 may include of list of inputs and/or GUI elements, and whether the inputs to the GUI elements are to be blocked. For example, the list of inputs may specify types of inputs (hover, click, etc.) that are to be blocked. Alternatively, or additionally, the list may specify GUI elements that are to be blocked. These GUI elements may be altered upon receiving an input. For example, an appearance of a button may change upon being hovered over. In this example, a hover input at the button may be included in the list stored in the event config. 432 so that hover inputs at the button are to be blocked. Other inputs and/or GUI elements not on the list may not be blocked.

When the screen element 220 receives a user input, the screen element 220 may forward the input to the application testing instructions 230, which may consult the event config. 432. If the input is in the event config. 432, the application testing instructions 230 may add the input to a queue of blocked inputs. On the other hand, if the input is not in the event configs 432, the application testing instructions 230 may forward the input to the AUT 235.

Regardless of how the state of the screen element 220 is changed, when in an active state, the screen element 220 may block inputs at the GUI 210 if the screen element 220 is overlaid onto the GUI 210. For example, if the screen element 220 is in the activated state, the screen element 220 may block inputs to any GUI element of the GUI 210 that is covered by the screen element. On the other hand, if the screen element 220 is in the de-activated state, the screen element 220 may not block inputs to the GUI 210 regardless of whether or not the screen element covers any portion of the GUI 210. As such, the screen element 220 may include a first ("activated") state in which the screen element blocks inputs or a second ("de-activated") state in which the screen element does not block inputs. In either instance, the screen element 220 may be toggled on or off completely via a single testing GUI element or an "on" testing GUI element and an "off" testing GUI element.

Examples of the system 400 in operation will now be described for illustration. The examples that follow may use a button click as a user input. However, other types of user inputs and other types of GUI elements may be used. In one example, a user may initiate a recording of test usage of the AUT 235. The application testing instructions 230 may create the screen element 220 (set the screen element 220 state to activated) responsive to initiation of the recording. The user may provide an input to the GUI 210, such as by clicking a button of the GUI 210. Because the screen element 220 is activated, the button click (a "blocked input") may instead be received by the screen element 220 and not the GUI 210. The screen element 220 may forward the button click (blocked input) to the application testing instructions 230. The application testing instructions 230 may store an indication of the button click in an automated (auto.) test script 442 and generate and store a GUI snapshot 422 that is an image of the GUI 210 as it exists at the time of the button click. In this manner, a replay engine may replay the auto. test script 442 by identifying the button that was clicked using the computer vision techniques and the indication of the button click (which may indicate a location on the GUI 210 and therefore on the GUI snapshot 422) where the button click or other user input occurred.

In some of these examples, a user may wish to have a user input provided to the GUI 210 for test usage recording. For example, a button click may cause a popup window to be created. The user may wish to have the popup window be generated, but if the screen element 220 is activated and is overlaid onto the button of the GUI 210, the button click may be blocked and the popup window may not be created. As such, the user may manually de-activate the screen element 220 by selecting a de-activate testing GUI element on the testing GUI 410 prior to the button click. Once the screen element 220 is de-activated, the user may click on the button. The screen element 220 may still receive the button click in the de-activated. The screen element 220 may forward an indication of the button click to the application testing instructions 230, which may determine that the screen element 220 is in the de-activated state based on the stored screen element state value. As before, when the screen elements 220 was activated, the application testing instructions 230 may generate and store a snapshot of the GUI 210 at the time of the button click, and store an indication of the button click to the auto. test script 442. Unlike before, the application testing instructions 230 may forward the button click to the AUT 235 because the screen element 220 is de-activated. The AUT 235 may receive an indication of the button click and may cause the popup window to be generated. In some examples, instead of de-activating the screen element 220, the user may move the screen element 220 such that it no longer overlays the button. The button click will then be directly received at the GUI 210, which may provide an indication of the button click to the application testing instructions 230 to include in the auto. test script 442.

It should be noted that the user may manually re-activate the screen element 220 for other test usage inputs. Furthermore, the user may manually activate the screen element 220 instead of automatic activation of the screen element when the recording of the test usage is started.

In another example operation involving automated activation and de-activation based on the event config. 432, a user may click on a button in the GUI 210. The screen element 220 may be activated and therefore block the button click. The screen element 220 may provide an indication of the button click to the application testing instructions 230. The application testing instruction 230 may consult the event config. 432 to determine whether the button click is to be blocked. If the button click is to be blocked according to the event config. 432, the button click may be added to a queue of blocked inputs. Otherwise, if the button click is not to be blocked according to the event config. 432, the application testing instruction 230 may record a snapshot and indication of the button click for generating the auto. test script 442, and may forward the button click to the AUT 235.

The user may continue test usage of the AUT 235 by providing further input, which may continue to be filtered based on the event config. 432 as previously described. In some examples, when no more inputs are to be provided (such as at the conclusion of the test usage recording), the application testing instruction 230 may provide the queue of blocked inputs to the AUT 235 after the corresponding GUI snapshots 422 have been generated. In this manner, because the AUT 235 acts upon the queue of blocked inputs (which may alter an appearance of a GUI element), the state of the GUI 210 is recorded in a snapshot before such altered appearance.

It should be noted that although only one screen element 220 is illustrated, multiple screen elements may be provided in the display area and each may be moveable and/or controlled to be in various states such as an on, activated, de-activated, and off state. It should be further noted that the inputs and blocked inputs illustrated in FIG. 4 may be provided to various components through the window manager 215 illustrated in FIG. 2 (but not illustrated in FIG. 4 for illustrative clarity).

Various manners in which the apparatus 100 may operate to prevent a change of state of a GUI (such as GUI 210) while recording an AUT (such as AUT 235) are discussed in greater detail with respect to the method 500 depicted in FIG. 5. It should be understood that the method 500 may include additional operations and that some of the operations described therein may be removed and/or modified without departing from the scopes of the method 500. The description of the method 500 is made with reference to the features depicted in FIGS. 1-4 for purposes of illustration.

FIG. 5 depicts a flow diagram of an example method 500 for preventing a change of state of a GUI 210 while recording an AUT 235. As shown in FIG. 5, at block 502, the processor 102 may initiate a recording of test usage with a graphical user interface (GUI) 210, the GUI 210 occupying some or all of a display space 403 of a display 401 and including a GUI element 212. In some examples, the processor 102 may identify the portion of the display space 403 occupied by the GUI 210, such as via the window manager 215. In these examples, the processor 102 may generate the screen element 220 based on the portion. For instance, the processor 102 may generate the screen element 220 to overlay the portion. Such overlay may be in a 1:1 fashion in a manner that the screen element 220 is the same size as the GUI 210 and is aligned along the X and Y axes of the GUI 210. In some examples, the processor 102 may set (via the window manager 215) the screen element 220 be a top-most element in the display space 403.

At block 504, the processor 102 may, responsive to initiation of the recording, generate a screen element 220 that is overlaid onto the GUI 210 and blocks user inputs from being provided to the GUI 210 to prevent a change of state of the GUI 210. The screen element 220 may fill the display space 403. Alternatively, the screen element 220 may only partially fill the display space 403. At block 506, the processor 102 may receive a user input at a location of the display space 403 corresponding to the GUI element 212, in which the user input is blocked from being provided to the GUI 210 by the screen element 220.

At block 508, the processor 102 may generate an entry in an automated test script based on the user input. In some examples, the processor 102 may replay the automated test script on the GUI 210 to recreate the user input. For example, the processor 102 may use computer vision techniques to identify a button or other GUI element 212 at which the user input was directed, identify a type of interaction (such as a button click), and perform the interaction on the GUI element 212.

Some or all of the operations set forth in the method 500 may be included as utilities, programs, or subprograms, in any desired computer accessible medium. In addition, the method 500 may be embodied by computer programs, which may exist in a variety of forms. For example, some operations of the method 500 may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

FIG. 6 depicts a block diagram of an example non-transitory machine-readable storage medium 600 for preventing a change of state of a graphical user interface (GUI) while recording an application under test (AUT). The non-transitory machine-readable storage medium 600 may be an electronic, magnetic, optical, or other physical storage device that includes or stores executable instructions. The non-transitory machine-readable storage medium 600 may be, for example, Random Access memory (RAM), an Electrically Erasable Programmable Read-Only Memory (EEPROM), a storage device, an optical disc, and the like. The non-transitory machine-readable storage medium 600 may have stored thereon machine-readable instructions 602-608 that a processor, such as the processor 102, may execute.

The machine-readable instructions 602 may cause the processor to initiate a recording of test usage with a graphical user interface (GUI), the GUI occupying some or all of a display space of a display and including a GUI element. The machine-readable instructions 604 may cause the processor to generate a partially or fully transparent window that is overlaid onto the GUI and blocks user inputs from being provided to the GUI to prevent a change of state of the GUI.

The machine-readable instructions 606 may cause the processor to receive a user input, in which the user input is blocked, by the partially or fully transparent window, from being provided to the GUI.

The machine-readable instructions 608 may cause the processor to generate an entry in an automated test script based on the user input. In some examples, the processor may terminate the recording and remove the transparent window upon termination of the recording. For example, the processor may receive an indication that the recording is to be terminated and may automatically remove the transparent window.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
   initiating, by a processor, a recording of test usage with a graphical user interface (GUI) element of an application under test (AUT), the GUI element occupying a first area of a display space;
   responsive to initiating the recording of the test usage, generating, by the processor, a screen element that is overlaid onto the GUI element, wherein the screen element is to block particular user inputs from being provided to the GUI element to prevent a change of an appearance of the GUI element;
   responsive to receiving a first user input on the screen element corresponding to the GUI element, consulting, by the processor, an event configuration to determine whether the first user input is to be blocked, wherein the event configuration specifies user inputs that change the appearance of the GUI element are to be blocked;
   responsive to a determination that the first user input is to be blocked according to the event configuration, blocking, by the processor, the first user input from being provided to the GUI element while recording the first user input in an automated test script and adding the first user input to a queue of blocked user inputs; and
   responsive to a determination that the first user input is not to be blocked according to the event configuration, allowing, by the processor, the first user input to be provided to the GUI element and forwarding the first user input to the AUT.

2. The method of claim 1, wherein generating the screen element comprises:
   generating the screen element to fill the display space.

3. The method of claim 1, wherein the GUI element occupies a portion of the display space, and wherein generating the screen element comprises:
   identifying, by the processor, the portion of the display space occupied by the GUI element; and
   generating, by the processor, the screen element based on a size of the portion of the display space occupied by the GUI element.

4. The method of claim 1, wherein the screen element is in an on state or in an off state, and when in the on state, the screen element is in an activated state to block the first user input or when in the off state, the screen element is in a deactivated state to allow the first user input to be provided to the GUI element, and
   wherein the method further comprises:
   in response to a first testing button in the display space being selected, causing, by the processor, the screen element to be in the on state; and
   in response to a second testing button in the display space being selected, causing, by the processor, the screen element to be in the off state.

5. The method of claim 1, further comprising:
   replaying, by the processor, the automated test script on the display space to recreate receiving the first user input on the GUI element.

6. An apparatus comprising:
   a processor; and
   a non-transitory computer readable medium on which is stored instructions that when executed by the processor, cause the processor to:
   initiate a recording of test usage of a graphical user interface (GUI) element of an application under test (AUT), the GUI element occupying a first area of a display space;
   responsive to initiating the recording of the test usage, generate a screen element that is overlaid onto the GUI element, wherein the screen element is to block particular user inputs from being provided to the GUI element and prevent a change of an appearance of the GUI element;
   responsive to receiving a first user input on the screen element corresponding to the GUI element, consult an event configuration to determine whether the first user input is to be blocked by the screen element, wherein the event configuration specifies user inputs that change the appearance of the GUI element are to be blocked;
   responsive to a determination that the first user input is to be blocked according to the event configuration, block the first user input from being provided to the GUI element while recording the first user input in an automated test script and adding the first user input to a queue of blocked user inputs; and
   responsive to a determination that the first user input is not to be blocked according to the event configuration, allow the first user input to be provided to the GUI element and forward the first user input to the AUT.

7. The apparatus of claim 6, wherein, to record the first user input in the automated test script, the instructions are further executed to cause the processor to:
   determine location coordinates of the first user input in the display space; and
   generate an entry in the automated test script based on the first user input and the location coordinates of the first user input.

8. The apparatus of claim 6, wherein, to generate the screen element, the instructions are further executed to cause the processor to:
generate a partially or fully transparent window; and
overlay the partially or fully transparent window on the GUI element to block the particular user inputs from being provided to the GUI element.

9. The apparatus of claim 6, wherein the instructions are further executed to cause the processor to:
receive, from a testing GUI separate from the GUI element, a request to block the particular user inputs from being provided to the GUI element; and
in response to receiving the request, determine that the screen element is to be generated.

10. The apparatus of claim 9, wherein the instructions are further executed to cause the processor to:
generate, in the testing GUI, a first testing GUI element that when actuated requests the screen element to be generated, wherein the request from the testing GUI is received based on actuation of the first testing GUI element.

11. The apparatus of claim 10, wherein the instructions are further executed to cause the processor to:
generate, in the testing GUI, a second testing GUI element that when actuated removes the screen element;
receive an indication that the second testing GUI element was actuated; and
remove the screen element based on the indication that the second testing GUI element was actuated.

12. The apparatus of claim 11, wherein the display space further includes a second GUI element, and wherein the instructions are further executed to cause the processor to:
receive a second user input at the second GUI element after the screen element has been removed, wherein the second user input at the second GUI element is not to be blocked; and
generate an entry in the automated test script based on the second user input.

13. The apparatus of claim 6, wherein the event configuration further specifies a plurality of events that, when they occur, trigger a generation of the screen element, and wherein the instructions are further executed to cause the processor to:
access the event configuration to determine whether one of the plurality of events that triggers the generation of the screen element has occurred; and
determine that the screen element is to be generated based on a determination that one of the plurality of events that triggers the generation of the screen element has occurred.

14. The apparatus of claim 6, wherein the instructions are further executed to cause the processor to:
generate a snapshot of the GUI element at a time when the first user input is received, wherein the snapshot is to be used during a replay of the automated test script; and
provide the queue of blocked user inputs to the AUT after the snapshot is generated.

15. The apparatus of claim 6, wherein the instructions are further executed to cause the processor to:
determine that the recording of the test usage was initiated.

16. The apparatus of claim 6, wherein the instructions are further executed to cause the processor to:
define a second area in the display space for placing the screen element; and
set a size of the second area to be equal to the first area.

17. The apparatus of claim 6, wherein the screen element is in an on state or in an off state, and when in the on state, the screen element is in an activated state to block the first user input or when in the off state, the screen element is in a deactivated state to allow the first user input to be provided to the GUI element, and
wherein the instructions are further executed to cause the processor to:
in response to a first testing button in the display space being selected, cause the screen element to be in the on state; and
in response to a second testing button in the display space being selected, cause the screen element to be in the off state.

18. The apparatus of claim 6, wherein the screen element is moveable in the display space, and wherein the instructions are further executed to cause the processor to:
move the screen element with respect to the GUI element while recording the test usage of the AUT.

19. A non-transitory computer readable medium on which is stored machine readable instructions that when executed by a processor, cause the processor to:
initiate a recording of test usage with a graphical user interface (GUI) element of an application under test (AUT), the GUI element occupying a first area of a display space;
responsive to initiating the recording of the test usage, generate a transparent window that is overlaid onto the GUI element, wherein the transparent window is to block particular user inputs from being provided to the GUI element to prevent a change of an appearance of the GUI element;
responsive to receiving a first user input on the transparent window corresponding to the GUI element, consult an event configuration to determine whether the first user input is to be blocked by the transparent window, wherein the event configuration specifies user inputs that change the appearance of the GUI element are to be blocked;
responsive to a determination that the first user input is to be blocked according to the event configuration, block the first user input from being provided to the GUI element while recording the first user input in an automated test script and adding the first user input to a queue of blocked user inputs; and
responsive to a determination that the first user input is not to be blocked according to the event configuration, allow the first user input to be provided to the GUI element and forward the first user input to the AUT.

20. The non-transitory computer readable medium of claim 19, wherein the instructions when executed by the processor are further executed to cause the processor to:
terminate the recording of the test usage; and
remove the transparent window upon termination of the recording of the test usage.

* * * * *